United States Patent [19]

Otsuka

[11] Patent Number: 5,894,100
[45] Date of Patent: Apr. 13, 1999

[54] ELECTRONIC MUSICAL INSTRUMENT

[75] Inventor: Satoshi Otsuka, Osaka, Japan

[73] Assignee: Roland Corporation, Osaka, Japan

[21] Appl. No.: 08/839,768

[22] Filed: Apr. 15, 1997

[30] Foreign Application Priority Data

Jan. 10, 1997 [JP] Japan .................................. 9-003083

[51] Int. Cl.$^6$ .................................................. G09B 15/02
[52] U.S. Cl. ................................... 84/477 R; 84/483.1
[58] Field of Search .......................... 84/477 R, 483.1, 84/470 R, 471 R, 472, 600, 609, 634

[56] References Cited

U.S. PATENT DOCUMENTS

| 4,350,070 | 9/1982 | Bahu . |
| 4,779,510 | 10/1988 | Abbeel .................. 84/464 R |
| 5,146,555 | 9/1992 | Kiyohara . |
| 5,353,063 | 10/1994 | Yagisawa et al. . |
| 5,400,687 | 3/1995 | Ishii ........................ 84/477 R |
| 5,596,160 | 1/1997 | Aoki ..................... 84/477 R X |
| 5,604,322 | 2/1997 | Kikuchi .................... 84/477 R |

FOREIGN PATENT DOCUMENTS 59-5288 12/1984 Japan .

*Primary Examiner*—William M. Shoop, Jr.
*Assistant Examiner*—Jeffrey W. Donels
*Attorney, Agent, or Firm*—Kubovcik & Kubovcik

[57] ABSTRACT

There is provided an electronic musical instrument capable of contributing to a higher speed in display, and also of displaying music in page feed format easy to see. In the electronic musical instrument, music data are developed into image data by a tempo clock interruption from a tempo clock unit in accordance with performance data. In addition, a part of the image data stored in a temporary memory is transferred to a VRAM in response to a timer interruption from a timer. In this manner, a page feed of the music displayed on a display unit is carried out being accompanied with an animation motion.

8 Claims, 7 Drawing Sheets

ELECTRONIC MUSICAL INSTRUMENT

BACKGROUND OF THE INVENTION

1. Field of the Invention

The present invention relates to an electronic musical instrument in which the music or score displayed on a screen is sequentially subjected to page feed as a musical performance advances.

2. Description of the Related Art

Hitherto, there is known an electronic musical instrument in which music is displayed on a screen, and the music displayed on the screen is sequentially subjected to page feed as a musical performance advances, that is, the page feed of so-called electronic music is carried out following a progression of the performance. According to such an electronic musical instrument, when the page feed of the music displayed on the screen is carried out, there is provided such a control that when the performance of the music now displayed is terminated, the music displayed on the screen is once erased in its entirety, and then music of the new page is displayed. However, this scheme is associated with such a problem that immediately before the page feed of the music displayed is carried out, a performer cannot know music information as to the successive performance. In order to solve this problem, in Japanese Patent Application Laid Open Gazette (Kokai) Sho. 59-5288, there is proposed technology such that a field (screen) is partitioned into two parts, that is, an upper stave and the lower stave, music is displayed on the upper stave and the lower stave, respectively, and in this condition, the music displayed on the stave associated with the termination of the performance is erased and the music of the successive page is displayed on the stave of concern. In this manner, music of mutually different pages is displayed on the upper stave and the lower stave, respectively.

However, such technology is associated with a problem that a display speed is slow, since there is adopted such a scheme that first the music displayed on the stave associated with the termination of the performance is erased once, and then the music of the successive page is displayed on the stave of concern.

Generally, in the event that image data representative of music information on the score is produced, in view of the fact that a large amount of memory is needed if image information associated with the overall field is maintained, there is provided such a processing that music information is encoded and stored, and when it is displayed, the encoded music information is developed. However, it is a great load for a CPU that the encoded music information is subjected to development processing to produce the image data as mentioned above. Thus, the conventional electronic musical instrument has been associated with a problem that in displaying the music on a screen, display speed is slow. Further, in the event that there is performed a partial page feed such that a part of the music of the successive page is displayed on a part of the music of the page now displayed, it happens in some cases that notes, symbols or the like to be displayed drop out depending upon the figure of the partial page feed. Taking into account the figure of the partial page feed and producing image data causes the development processing to be very complicated. Thus, the conventional electronic musical instrument has been associated with also a problem that a display speed becomes further slower.

SUMMARY OF THE INVENTION

In view of the foregoing, it is therefore an object of the present invention to provide an electronic musical instrument capable of contributing to higher speed in display and also to displaying music in the form of page feed easy to see.

To achieve the above-mentioned object, according to the present invention, there is provided an electronic musical instrument comprising:

(1) performance information generating means for generating performance information of a musical composition;

(2) performance means for performing the musical composition in accordance with the performance information generated from said performance information generating means;

(3) temporary storage means for temporarily storing image information representative of sheets of music of the musical composition to be performed;

(4) image information generating means for generating image information representative of sheets of music of the musical composition to be performed to write the same into said temporary storage means;

(5) music update instruction information generating means for generating music update instruction information to instruct update of sheets of music as the performance of the musical composition by said performance means advances; and (6) display means having a frame memory for storing image information and a screen on which image based on the image information stored in said frame memory is displayed, wherein when said music update instruction information generating means generates the music update instruction information, said frame memory takes in the image information temporarily stored in said temporary storage means, and sheets of music are displayed on the screen in accordance with the image information stored in said frame memory.

According to the electronic musical instrument of the present invention, when the music update instruction information is generated, the image information temporarily stored in the temporary memory is taken in the frame memory and sheets of music are displayed on a screen of the display unit on the basis of the image information stored in the frame memory. This feature makes it possible in page feeding to overwrite image information representative of music of the successive page on the image information stored in the frame memory. Consequently, it is possible to display the music of the successive page without erasing once the image information now on display, thereby contributing to a higher speed in display.

In the electronic musical instrument as mentioned above, it is preferable that said music update instruction information generating means generates, at least, first page feed information indicating a fact that a musical performance advances to a first predetermined position of music displayed on the screen of said display means, said first page feed information being a kind of said music update instruction information, and second page feed information indicating a fact that a musical performance advances to a second predetermined position of music displayed on the screen of said display means, said second predetermined position being different from the first predetermined position, and said second page feed information being a kind of said music update instruction information, and that said display means is responsive to occurrence of the first page feed information from said music update instruction information generating means and takes in and displays image information representative of a part of music of the successive page from said temporary storage means instead of image information representative of a part of music of a present page corresponding to said part of music of the successive page, and said display means is responsive to occurrence of the second page feed information from said music update instruction information generating means and takes in and displays image information representative of a remaining part, except said part, of music of the successive page from said temporary storage means instead of image information representative of a part of music of a present page corresponding to said remaining part of music of the successive page.

Displaying image information in accordance with the first page feed information makes it possible to display the corresponding portion of music of the successive page on the first portion, on which the performance is already over, of the music of the page now on display. Thus, it is possible to readily know information as to the successive music. Further, displaying image information in accordance with the second page feed information makes it possible to display the corresponding portion of music of the successive page on the second portion, on which the performance is already over, of the music of the page now on display, in addition to the first portion of the music of the successive page. Consequently, performing the partial page feed in this manner makes it possible to display the music of the successive page in its entirety. In some figures of the partial page feed, it happens that notes and symbols to be displayed, drop out. It causes the developing processing to be very complicated that image data are produced taking into account such figures of the partial page feed, whereby the display speed slow downs. This problem has been solved in accordance with the electronic musical instrument of the present invention in which only a portion associated with the image information, which is previously subjected to the development processing and stored in the temporary memory, is transferred to the frame memory.

Further, it is preferable that the electronic musical instrument as mentioned above further comprises page feed format information generating means for generating page feed format information to define a format of combination of a part of music on a page now on performance and a part of music on the successive page, and said display means displays music in a format based on the page feed format information generated by said page feed format information generating means.

Displaying music of the format based on the page feed format information makes it possible to optionally select various types of page feed, such as a vertical turning over, a horizontal turning over and a slant turning over in page feed of music or scores, thereby increasing a degree of freedom.

Further, in the electronic musical instrument mentioned above, it is acceptable that said page feed format information generating means generates the page feed format information according to a display mode for a page of music.

In the event that the page feed format information generating means generates the page feed format information according to a display mode for a page of music, it is possible to select the optimal page feed format in accordance with the display mode for music in such a manner that for example, in a case where upper and lower two staves of music are displayed on the screen, it is preferable that the music or score is vertically turned over, and on the other hand, in a case where only one stave of music is displayed on the screen, if the music or scores are vertically turned over, the music drops out by the half and thus it is not practical, hence a horizontal turning over type of page feed format is selected.

Furthermore, in the electronic musical instrument mentioned above, it is acceptable that said display means is responsive to occurrence of the music update instruction information from said music update instruction information generating means and sequentially takes in and displays image information temporarily stored in said temporary storage means, each partitioned image information corresponding to an associated one of a plurality of partial areas of a field.

This feature makes it possible in page feeding to partially sequentially display the page of concern. Thus, it is possible to implement a so-called animation motion, thereby giving users a feeling of the natural page feed.

Still furthermore, in the electronic musical instrument mentioned above, it is acceptable that the electronic musical instrument further comprises page feed format information generating means for generating page feed format information to define a format of update when the music displayed on the screen of said display means is updated, and that said display means is responsive to occurrence of the music update instruction information from said music update instruction information generating means and sequentially takes in and displays image information temporarily stored in said temporary storage means, each partitioned image information corresponding to an associated one of a plurality of partial areas of a field, in a format according to the page feed format information generated from said page feed format information generating means.

This feature makes it possible to optionally select various types of page feed, such as a vertical turning over, a horizontal turning over and a slant turning over in page feed of music or scores on the screen, being accompanied with the animation motion, thereby increasing a degree of freedom.

Still yet furthermore, in the electronic musical instrument mentioned above, it is acceptable that said display means takes in and displays said partitioned image information at a speed according to a tempo of a musical composition now on performance.

This feature makes it possible to gradually display the successive pages at a speed according to a tempo of a musical composition, being accompanied with the animation motion, thereby performing the natural page feed operation meeting the tempo interval of users.

DESCRIPTION OF THE PREFERRED EMBODIMENTS

Hereinafter, there will be described embodiments of the present invention.

Figure 1:
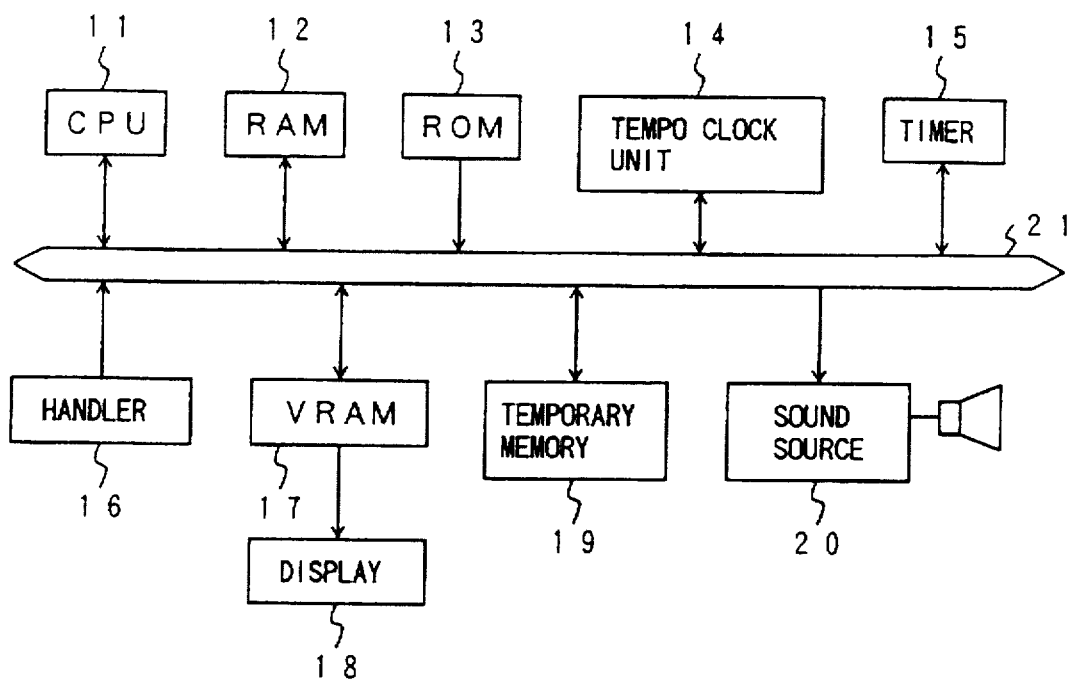
FIG. 1 is a block diagram of an electronic musical instrument according to an embodiment of the present invention.

FIG. 1 is a block diagram of an electronic musical instrument according to an embodiment of the present invention.

In FIG. 1, a CPU 11 reads a program stored in a ROM 13 via a data bus 21 and performs various processings.

A RAM 12 stores music data of a score for a performance, performance data produced by a performance, data as to various type of handlers, various type of flags and the like.

The ROM 13 stores the program to control the electronic musical instrument shown in FIG. 1 in its entirety.

A tempo clock unit 14 generates a tempo clock interruption in tempo instructed by the CPU 11, that is, in timing (tick) in which a quarter note is divided equally among ninety-six. This tempo clock interruption is a basic clock for an automatic performance and the like.

A timer 15 generates a timer interruption at the time instructed by the CPU 11. The timer interruption determines a transfer timing of the partitioned images for animation motions which will be described later.

A handler 16 is provided with a plurality of switches for setting up various states of the electronic musical instrument shown in FIG. 1. A user may set up through these switches a page of a number of staves on a score, a number of measures per stave, and the like, which are displayed on a screen of a display unit 18 which will be described later.

A VRAM 17 is a so-called frame memory for storing image data to be displayed on the screen of the display unit 18.

The display unit 18 comprises a CRT and a generator circuit for generating a display signal, and serves to display music represented by the image data stored in the VRAM 17.

A temporary memory (or an off bit map) 19 stores temporarily the image data, and has a similar structure to that of the VRAM 17.

A sound source 20 generates a musical tone having a pitch designated by the CPU 11.

Figure 2:
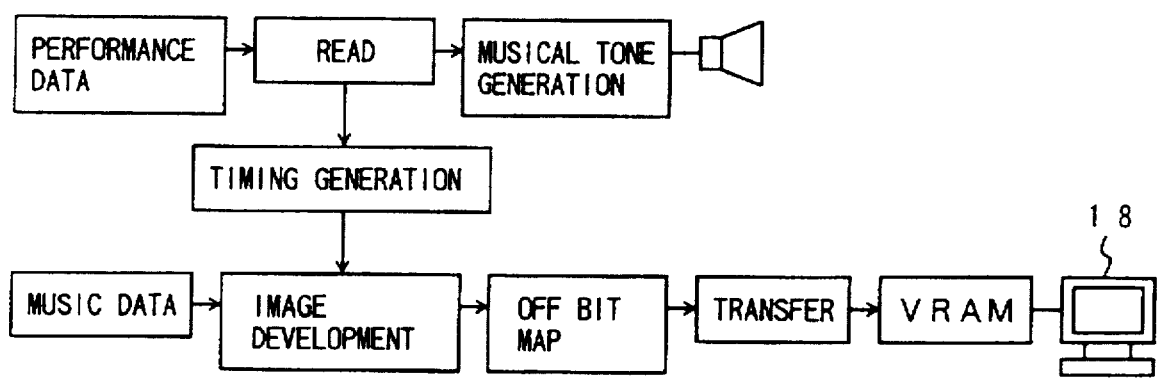
FIG. 2 is a view useful for understanding a flow of data in the electronic musical instrument shown in FIG. 1.

FIG. 2 is a view useful for understanding a flow of data in the electronic musical instrument shown in FIG. 1.

On a screen of the display unit 18 shown in FIG. 2, there is displayed the first page of music represented by the image data stored in the VRAM 17. The temporary memory 19, or the off bit map, stores image data associated with the second page of music.

When performance data stored in the RAM 12 is read out and fed to the sound source 20, the sound source 20 generates a musical tone. On the other hand, the tempo clock unit 14 generates an interruption in accordance with the performance data thus read, so that the third page of music data is developed to image data. Further, the timer 15 generates a timer interruption, so that the image data associated with the second page of music, which are stored in the off bit map, are sequentially read out from the off bit map for every one of partitioned image data, each corresponding to the associated one of a plurality of partial areas and then transmitted to the VRAM 17. In this manner, the first half of the first page of score now on display, which is over in performance, is replaced by the first half of the second page of score, being accompanied with the animation motions. Here, in writing the second page of image data stored in the off bit map into the VRAM 17, the second page of image data is overwritten on the first page of image data stored in the VRAM 17 and now on display without erasing the same. Thus, as compared with the prior art in which image data of the stave on which a performance is over is once erased and then the successive page of image data is displayed, it is possible to contribute to providing a higher speed in display.

Figure 3:
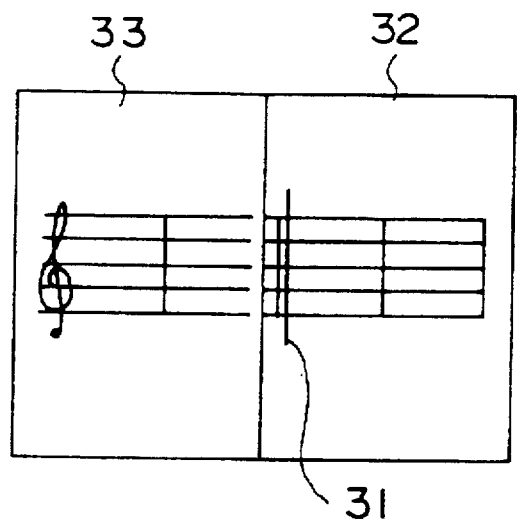
FIG. 3 is an illustration of a partial page feed involved in horizontal turning over.

FIG. 3 is an illustration of a partial page feed involved in horizontal turning over.

On a screen shown in FIG. 3, there is displayed only one stave of music. On the right half of the screen, there are displayed a cursor 31 indicating the present performance position and the latter half 32 of the score of the page now on performance. On the other hand, on the left half of the screen, there is displayed the first half 33 of the score of the successive page. Thus, in the event that there is displayed only one stave of music, if the score is vertically turned over, the music in performance will be missing half and thus it is not practical. Hence, there is selected a horizontal turning over type of page feed.

Figure 4:
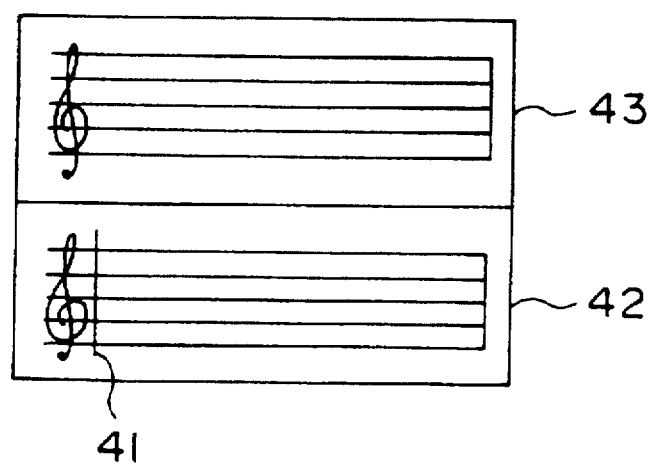
FIG. 4 is an illustration of a partial page feed involved in vertical turning over.

FIG. 4 is an illustration of a partial page feed involved in vertical turning over.

On a screen shown in FIG. 4, there are displayed two staves of music. On the lower half of the screen, there are displayed a cursor 41 indicating the present performance position and the latter half 42 of the score of the page now on performance. On the other hand, on the upper half of the screen, there is displayed the first half 43 of the score of the successive page. Thus, in the event that there is displayed two staves (upper and lower) of music, there is selected a vertical turning over type of page feed.

Figure 5:
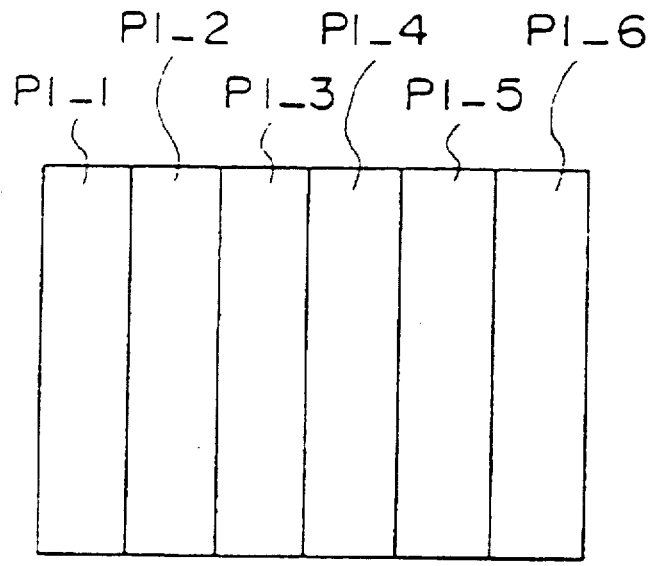
FIG. 5 is an illustration of the partitioned images for animation motions involved in horizontal turning over.

FIG. 5 is an illustration of the partitioned images for animation motions involved in horizontal turning over.

According to the present embodiment, the animation motion of every half page involved in horizontal turning over is performed in accordance with the following scheme.

One page is partitioned into six areas from areas P1_1 to P1_6 with respect to a horizontal direction of the screen. And through the timer interruption of the timer 15, three areas from areas P1_1 to P1_3 constituting the first half page are sequentially displayed. Alternatively, three areas from areas P1_4 to P1_6 constituting the latter half page are sequentially displayed. Thus, the animation motion is performed in such a manner that the score is actually turned over in the horizontal direction.

Figure 6:
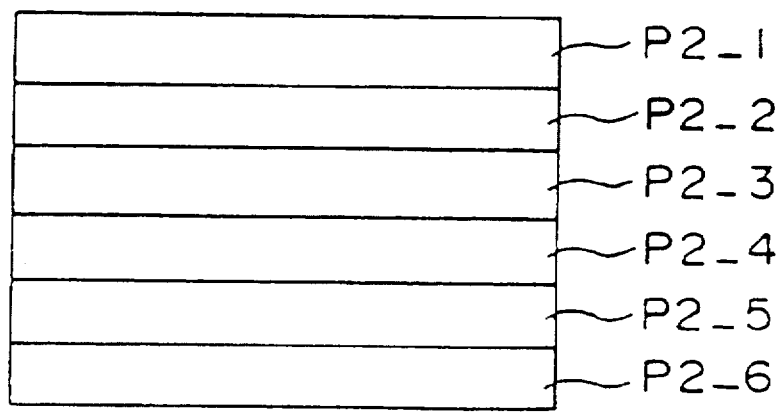
FIG. 6 is an illustration of the partitioned images for animation motions involved in vertical turning over.

FIG. 6 is an illustration of the partitioned images for animation motions involved in vertical turning over.

According to the present embodiment, the animation motion of every half page involved in vertical turning over is performed in accordance with the following scheme.

One page is partitioned into six areas from areas P2_1 to P2_6 with respect to a vertical direction of the screen. And through the timer interruption of the timer 15, three areas from areas P2__1 to P2__3 constituting the first half page are sequentially displayed. Alternatively, three areas from areas P2__4 to P2__6 constituting the latter half page are sequentially displayed. Thus, the animation motion is performed in such a manner that the score is actually turned over in the vertical direction.

Figure 7:
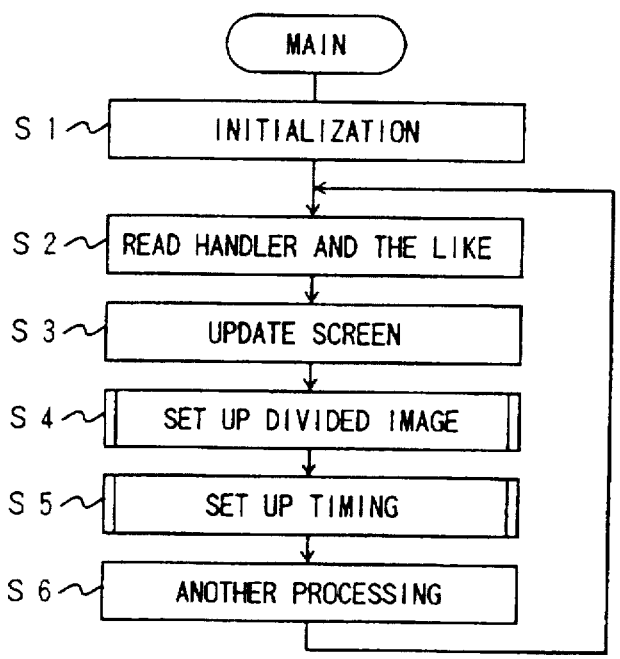
FIG. 7 is a flowchart of a main routine in the electronic musical instrument shown in FIG. 1.

FIG. 7 is a flowchart of a main routine in the electronic musical instrument shown in FIG. 1.

When the power source is turned on in the electronic musical instrument shown in FIG. 1, the main routine is executed.

First, in step S1 an initialization is carried out. In the initialization, a musical performance data is read, a meter is established, and the number C of performance clocks per measure, or a number of ticks, is set up. Further, in the initialization, the score of the first page is displayed, and the score of the second page is developed in image and then stored in the bit off map. Furthermore, an interruption timing of a tempo clock is set up in accordance with a tempo of a musical composition, and also a timing of the timer interruption is set up to a predetermined value. In addition, initialization of various types of flags and variables is performed.

Next the process goes to step S2 in which the states of the handlers or the like set up by users are read, and then the program proceeds to step S3 in which the display screen is updated in compliance with the number (S) of display staves set up by users and the number (M) of measures per stave. Next, the process goes to step S4 for a subroutine for setting partitioned images. In the step S4, there are set up areas for storing image data for each partitioned image corresponding to the associated one of a plurality of partial areas of a field, which will be described in detail later. Next, the process goes to step S5 for a subroutine for setting timings. In the step S5, there are set up a timing of image development and a timing of page feed, which will also be described in detail later.

Next, the program proceeds to step S6 in which in the event that a performance start switch, which is one of the handlers, is depressed by a user, such a state that a tempo clock interruption is permitted is provided to perform a performance start processing, and another necessary processing is carried out. Thereafter, the program returns to step 2.

Figure 8:
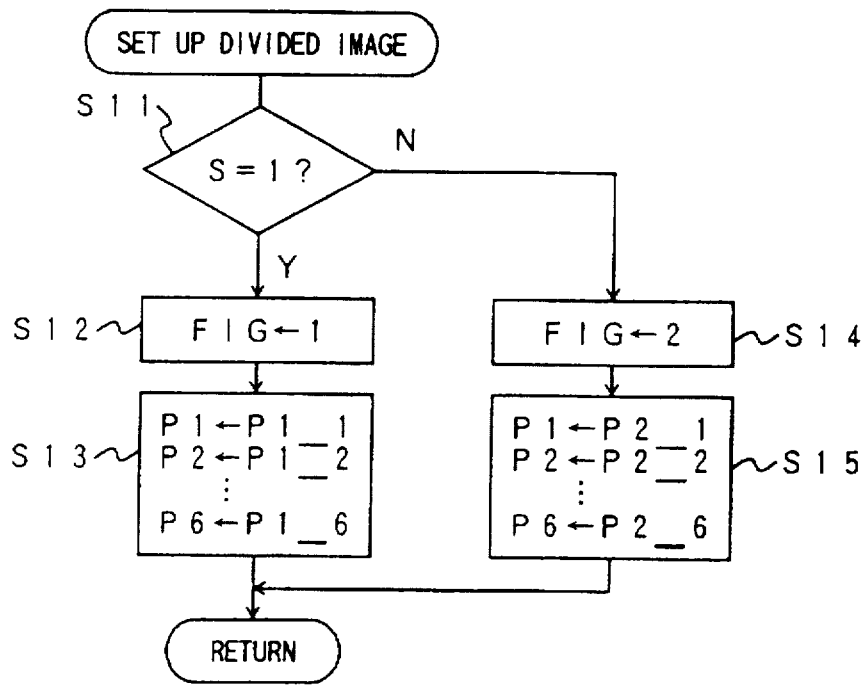
FIG. 8 is a flowchart of a subroutine for setting up the partitioned images in the main routine shown in FIG. 7.

FIG. 8 is a flowchart of a subroutine for setting up the partitioned images in the main routine shown in FIG. 7.

First, in step 11, it is determined as to whether the number (S) of staves in display is "1" or not. In the event that the it is decided that the number (S) of staves in display is "1", the program proceeds to step 12 for performing a horizontal turning over. In step 12, number "1" (indicating a horizontal turning over figure) is substituted into a register FIG for indicating a figure as to whether it is concerned with the vertical turning over or the horizontal turning over. Then, the program proceeds to step 13 in which coordinates for the partitioned areas from the areas P1__1 to P1__6 shown in FIG. 5 are set up to coordinate variables P1 to P6, respectively, and returns to the main routine.

On the other hand, in step 11, In the event that the it is decided that the number (S) of staves in display is not "1", the program proceeds to step 14 for performing a vertical turning over. In step 14, number "2" (indicating a vertical turning over figure) is substituted into the register FIG. Then, the program proceeds to step 15 in which coordinates for the partitioned areas from the areas P2__1 to P2__6 shown in FIG. 6 are set up to coordinate variables P1 to P6, respectively, and returns to the main routine.

Figure 9:
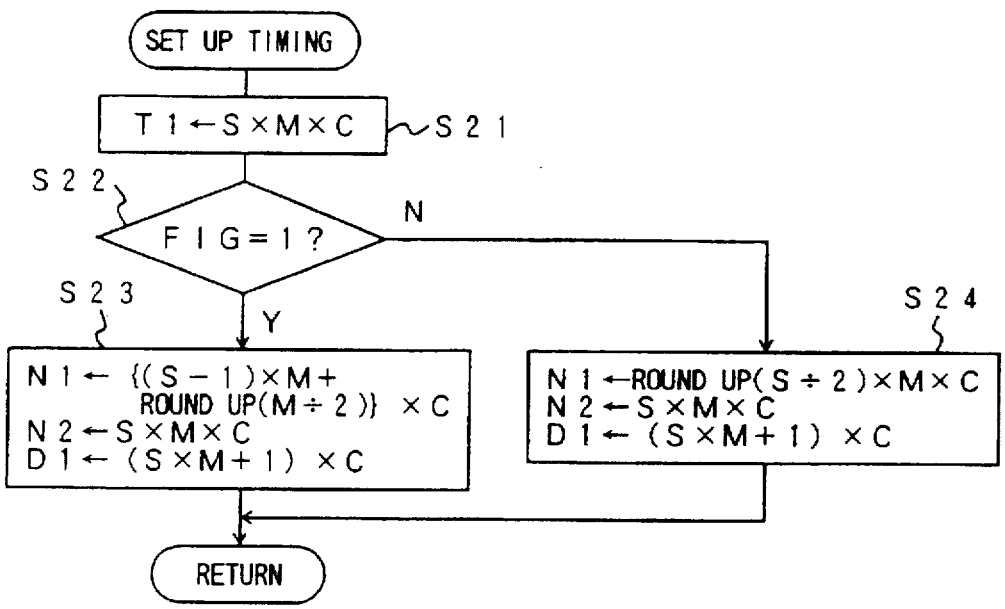
FIG. 9 is a flowchart of a subroutine for setting up the timing in the main routine shown in FIG. 7.

FIG. 9 is a flowchart of a subroutine for setting up the timing in the main routine shown in FIG. 7.

First, in step 21, S (number of staves in display per page)×M (measure per stave)×C (number of ticks per measure) is substituted into a variable T1 (tick) indicating a page of performance time. Next the process goes to step 22 in which it is determined as to whether the register FIG is "1" (figure of horizontal turning over). In a case where it is determined that the register FIG is "1", the program proceeds to step 23.

In step 23, in order to set up timing of the image development of the horizontal turning over and timing of the page feed, first a value [(S−1)×M+Round Up (M+2)]×C, which indicates timing over the central measure position of measures constituting the last stave, is substituted into a partial page feed timing variable N1. Where the Round Up means to shorten the fractional part of a number increasing the last remaining (rightmost) digit. Next, a value (S×M×C), which indicates a page of timing, is substituted into a complete page feed timing variable N2 to perform a complete page feed. Further, a value [(S×M+1)×C], which indicates a timing in which further one measure of timing elapses in addition to the value (S×M×C) indicating a page of timing, is substituted into an image development timing variable D1 to produce image data through a development processing of the encoded musical tone data. Thus, the timing of the image development is different from the timing of the page feed, thereby preventing the timing of the image development and the timing of the page feed from overlapping each other. Accordingly, it is possible to reduce the load of the CPU. After the step S23 is over, the program returns to the main routine.

On the other hand, in step S22, in a case where it is determined that the register FIG is not "1", the program proceeds to step 24. In step 24, in order to set up timing of the image development of the vertical turning over and timing of the page feed, first a value [Round Up (S+2)×M×C], which indicates timing over the central stave displayed on the screen, is substituted into a partial page feed timing variable N1. Next, the value (S×M×C) is substituted into the complete page feed timing variable N2. Further, the value [(S×M+1)×C] is substituted into the image development timing variable D1. After the step S24 is over, the program returns to the main routine.

Figure 10:
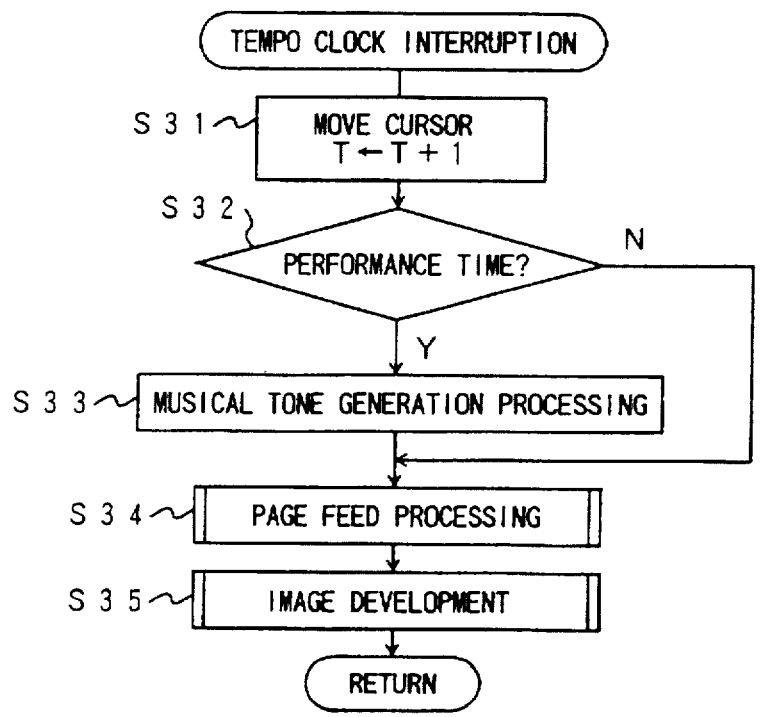
FIG. 10 is a flowchart of a tempo clock interruption processing routine.

FIG. 10 is a flowchart of a tempo clock interruption processing routine.

The tempo clock interruption processing routine starts when an interruption to the CPU occurs by the tempo clock unit 14 (FIG. 1).

First, in step S31, a cursor on a screen is travelled in accordance with a step up (a timing in which a quarter note is divided equally among ninety-six) of the clock, and the present performance position T (Tick) is incremented.

Next, the process goes to step S32 in which it is determined as to whether a performance time for reading performance data elapses. In a case where it is determined that the performance time elapses, the program proceeds to step 33 in which a musical tone generation processing is carried out, and then proceeds to step S34. On the other hand, in step S32, in a case where it is determined that the performance time does not elapse, the program proceeds directly to step S34. In step S34 for a page feed processing subroutine, as will be described later in detail, it is determined as to whether the present performance position T reaches the timing of the complete page feed or the timing of the partial page feed, and a processing for the complete page feed or a processing for the partial page feed is designated in accordance with a determination result, and the program proceeds to step S35. In step S35 for an image development subroutine, as also will be described later in detail, it is determined as to whether the present performance position T reaches the image development timing, and when it is determined that the present performance position T reaches the image development timing, an image development processing for developing music data to image data. When step S35 is over, the program returns to the main routine.

Figure 11:
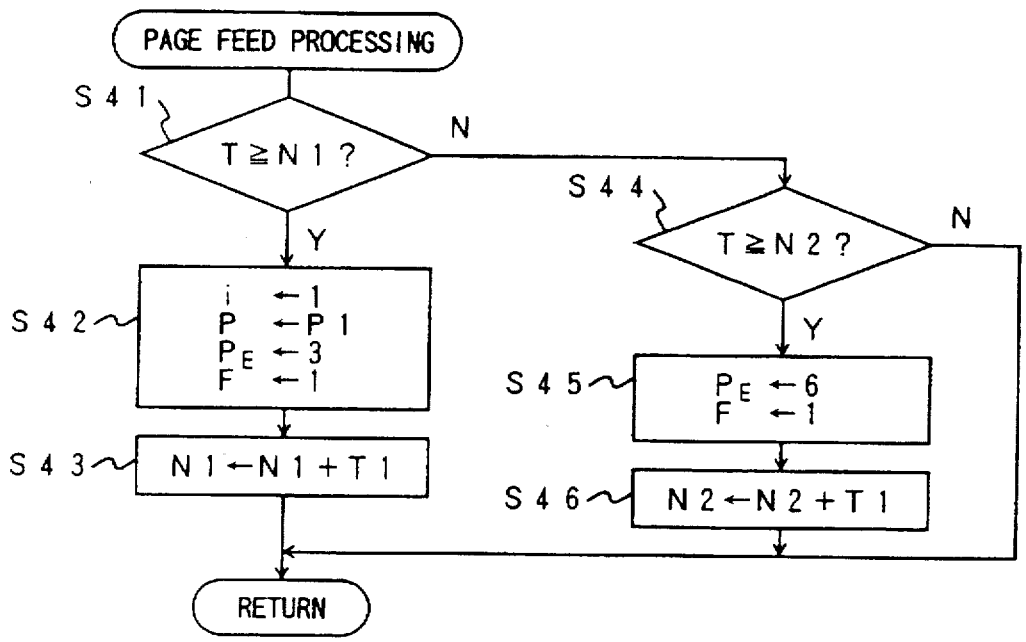
FIG. 11 is a flowchart of a subroutine for a page feed processing in the tempo clock interruption processing routine shown in FIG. 10.

FIG. 11 is a flowchart of a subroutine for a page feed processing in the tempo clock interruption processing routine shown in FIG. 10.

First, in step S41, it is determined as to whether the present performance position T is not less than the partial page feed timing variable N1. In a case where it is determined that the present performance position T is not less than the partial page feed timing variable N1, the program proceeds to step S42 to carry out the partial page feed. In step S42, a coordinate index i is set to 1, a coordinate variable P1 is set up for transfer coordinates P, and a transfer end value $P_E$ is set to a value 3 indicating the corresponding half page. According to the present embodiment, a page corresponding is partitioned into a six segments of partitioned images, and the partial page feed operation is carried out every half page. Thus, the value 3 is set up for indication of the half page corresponding. Further, in step S42, the timer interruption flag F is set to 1 to provide a state in which the timer interruption is allowed. Next, the program proceeds to step S43 in which the variable T1 indicating a page of performance time set up by the performance clock is added to the partial page feed timing variable N1, and the resultant is substituted into the partial page feed timing variable N1 so that the partial page feed timing variable N1 is changed to one associated with the next page. Thereafter the process goes to the main routine.

On the other hand, in step S41, in a case where it is determined that the present performance position T is less than the partial page feed timing variable N1, the program proceeds to step S44 in which it is determined as to whether the present performance position T is not less than the complete page feed timing variable N2. In a case where it is determined that the present performance position T is less than the complete page feed timing variable N2, the program returns to the main routine. On the other hand, in a case where it is determined that the present performance position T is not less than the complete page feed timing variable N2, the program proceeds to step S45 to carry out the complete page feed. In step S45, the transfer end value $P_E$ is set to a value 6 indicating the full page or one page corresponding. Further, in step S45, the timer interruption flag F is set to 1 to provide a state in which the timer interruption is allowed. Next, the program proceeds to step S46 in which the variable T1 indicating a page of performance time is added to the complete page feed timing variable N2, and the resultant is substituted into the complete page feed timing variable N2 so that the complete page feed timing variable N2 is changed to one associated with the next page. Thereafter the process goes to the main routine.

Figure 12:
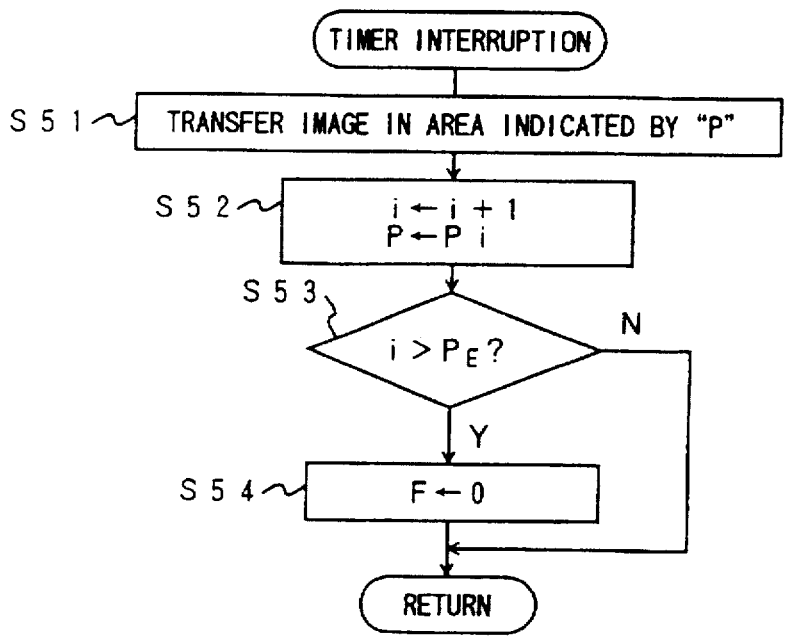
FIG. 12 is a flowchart of a processing routine for a timer interruption in the tempo clock interruption processing routine.

FIG. 12 is a flowchart of a processing routine for a timer interruption in the tempo clock interruption processing routine.

In condition for allowance of the timer interruption, when an interruption to the CPU occurs by the timer 15 (FIG. 1), the processing routine for the timer interruption starts. This routine permits the partitioned images to be sequentially transferred from the off bit map to the VRAM 17, so that the partitioned images are gradually displayed, whereby the partial page feed accompanied with a so-called animation operation is carried out.

First, in step S51, image data involved in the area defined by the transfer coordinates P are read from the bit map and written into the VRAM 17, so that a part of image data now on display is replaced by a partial image data of the successive page. Next, the process goes to step S52 in which the coordinate index i is incremented and then substituted into the transfer coordinates P. Next, the process goes to step S53 in which it is determined as to whether the coordinate index i is larger than the transfer end value $P_E$. In a case where it is determined that the coordinate index i is larger than the transfer end value $P_E$, the process goes to step S54, since the transfer of a half page of image data is over. In step S54, the timer interruption flag is set to 0 to offer the inhibit of the timer interruption, and the program returns to the main routine. On the other hand, in a case where it is determined that the coordinate index i is less than the transfer end value $P_E$, the program returns directly to the main routine.

Figure 13:
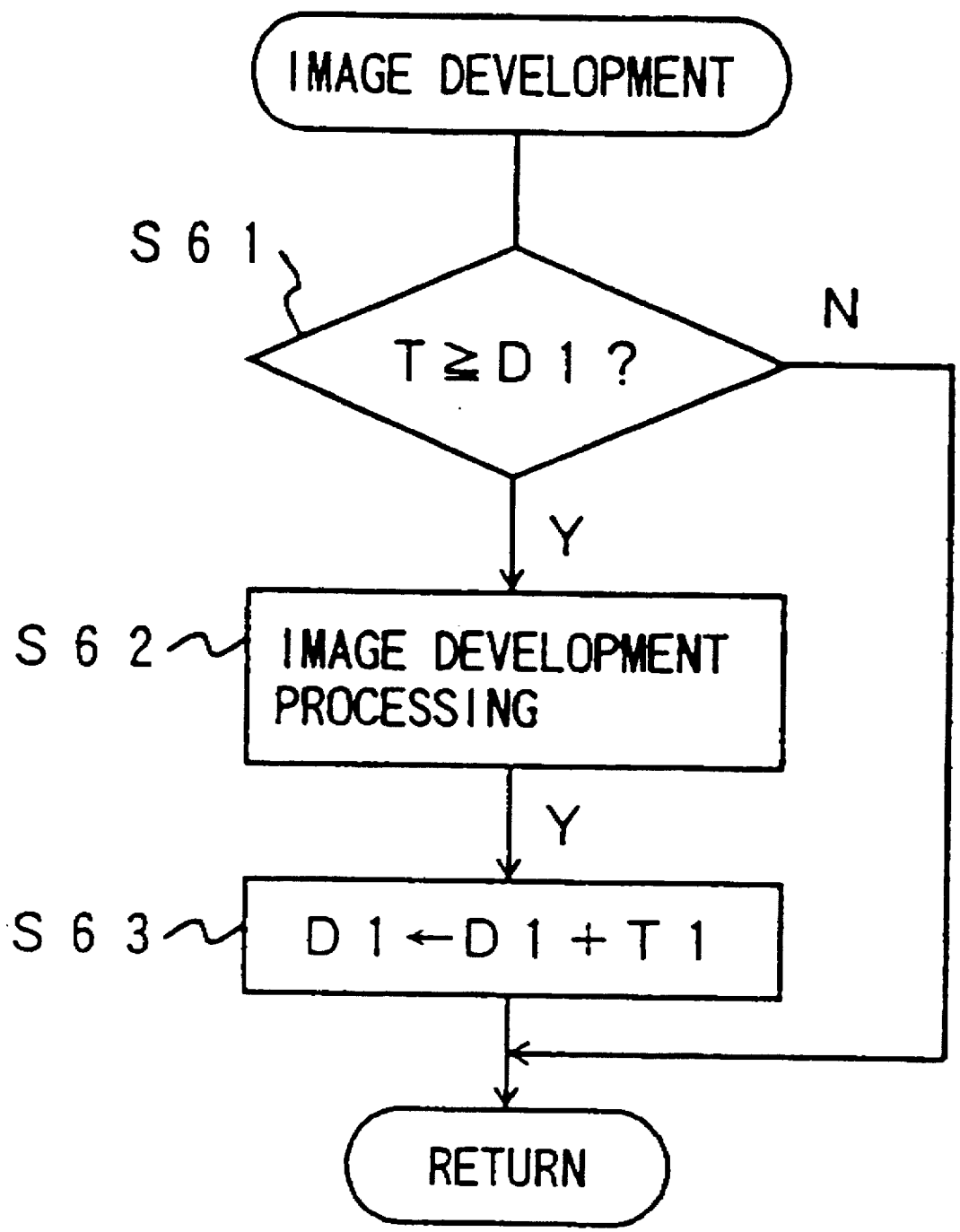
FIG. 13 is a flowchart of an image development subroutine shown in FIG. 10.

FIG. 13 is a flowchart of an image development subroutine shown in FIG. 10.

First, in step S61, it is determined as to whether the present performance position T is not less than the image development timing variable D1. In a case where it is determined that the present performance position T is not less than the image development timing variable D1, the program proceeds to step S62 to produce image data processed through development of the encoded music data. In step S62, the music data are read and developed into the image data in processing. The thus obtained image data are stored in the off bit map. Next, the program proceeds to step S63 in which the variable T1 indicating a page of performance time is added to the image development timing variable D1, and the resultant is substituted into the image development timing variable D1 so that the image development timing variable D1 is changed to one associated with the next page. Thereafter the process goes to the main routine.

Incidentally, according to the present embodiment, while the off bit map is for a field (page) corresponding, it is acceptable that two fields of off bit map, of a field or screen now on display and a field for exclusive use in page feed, is provided, and the field now on display and the field for exclusive use in page feed are selectively displayed. Generally, in many cases, it happens that a VRAM stores music data and another application data different from the music data. In such a case, the music or score and another application are simultaneously displayed on the screen. Then, the provision of such a two-field of off bit map makes it easy to perform a re-drawing, even if the re-drawing is needed.

Further, according to the present embodiment, while the image transfer processing is transferred through a designation of coordinates of the partitioned areas, it is acceptable that while the VRAM end is provided with a portion (mask) for inhibiting areas except the partitioned areas associated with the designated coordinates from being displayed so as to transfer the overall field of image data to the VRAM, finally, only the partitioned areas are displayed. In this case, it is effective that the figure of the mask is sequentially changed to gradually perform the page feed.

Furthermore, according to the present embodiment, while the timings of the image development and the page feed are set up in accordance with the performance clock (tick), those timings are set up on the basis of performance time. Further, according to the present embodiment, while the transfer timing of the partitioned images is set up by the timer, it is acceptable that the transfer timing of the partitioned images is set up in accordance with the performance clock. In this case, the processing is made in accordance with the tempo clock interruption, but not the timer interruption. This feature makes it possible to perform the animation motion in timing according to the tempo of music. Thus, it is possible to implement the page feed operation meeting the user's tempo feeling.

Still further, according to the present embodiment, while the music data are previously stored in the RAM, it is acceptable that the music data are produced by means of conversion from the performance data.

Still furthermore, according to the present embodiment, while the image data are produced through the development processing of the encoded music data, it is acceptable that the image data are previously stored. Further, in case of stoppage of the performance, it is acceptable that a page feed switch is provided to carry out the page feed. This feature makes it possible, in a case where the performance on the page now on play is stopped and the process shifts to the performance on the successive page, to advance directly to the successive page, without carrying out the partial page feed on the remaining portion of the page now on play.

Still yet further, according to the present embodiment, while a page feed of figure is automatically set up in accordance with the number of staves of scores or music, it is acceptable that there is provided an arrangement in which users set up the figure. Further, the page feed figure is not restricted to the vertical turning over and the horizontal turning over, and it is acceptable that the page feed figure is of slanting type or another type. In this case, in a similar fashion to that of the present embodiment, timing of the partial page feed may be set up to meet the figure selected.

Still yet furthermore, according to the present embodiment, while the partial page feed operation is performed every half page, it is acceptable that in performing the vertical page feed, the partial page feed operation is performed in turn whenever the performance on each stave is over.

It is noted that if timing of the page feed involved in the vertical turning over is shifted by one stave corresponding from the stave on which the performance is over, it will be easy to see.

As described above, according to the present invention, in sequentially page feeding the scores or musics displayed on the screen as the musical performance advances, it is possible to contribute to a higher speed in display, and also to display the scores or music in the form of page feed easy to see.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. An electronic musical instrument comprising:
   performance information generating means for generating performance information of a musical composition;
   performance means for performing the musical composition in accordance with the performance information generated from said performance information generating means;
   temporary storage means for temporarily storing image information representative of music of the musical composition to be performed;
   image information generating means for generating image information representative of music of the musical composition to be performed to write said image information into said temporary storage means;
   music update instruction information generating means for generating music update instruction information to instruct update of music as the performance of the musical composition by said performance means advances; and
   display means having a frame memory for storing image information and a screen on which image based on the image information stored in said frame memory is displayed, wherein when said music update instruction information generating means generates the music update instruction information, said frame memory takes in the image information temporarily stored in said temporary storage means, and music are displayed on the screen in accordance with the image information stored in said frame memory.

2. An electronic musical instrument according to claim 1, wherein said music update instruction information generating means generates, at least, first page feed information indicating a fact that a musical performance advances to a first predetermined position of music displayed on the screen of said display means, said first page feed information being said music update instruction information, and second page feed information indicating a fact that a musical performance advances to a second predetermined position of music displayed on the screen of said display means, said second predetermined position being different from the first predetermined position, and said second page feed information being said music update instruction information, and wherein said display means is responsive to occurrence of the first page feed information from said music update instruction information generating means and takes in and displays image information representative of a part of music of the successive page from said temporary storage means instead of image information representative of a part of music of a present page corresponding to said part of music of the successive page, and said display means is responsive to occurrence of the second page feed information from said music update instruction information generating means and takes in and displays image information representative of a remaining part of music of the successive page from said temporary storage means instead of image information representative of a part of music of a present page corresponding to said remaining part of music of the successive page.

3. An electronic musical instrument according to claim 2, further comprising page feed format information generating means for generating page feed format information to define a format of combination of a part of music on a page now on performance and a part of music of the successive page,
   wherein said display means displays music of a format based on the page feed format information generated by said page feed format information generating means.

4. An electronic musical instrument according to claim 3, wherein said page feed format information generating means generates the page feed format information according to a display mode for a page of music.

5. An electronic musical instrument according to claim 1, wherein said display means is responsive to occurrence of the music update instruction information from said music update instruction information generating means and sequentially takes in and displays image information temporarily stored in said temporary storage means each for partitioned image information corresponding to an associated one of a plurality of partial areas of the screen of said display means.

6. An electronic musical instrument according to claim 5, further comprising page feed format information generating means for generating page feed format information to define a format of update when the music displayed on the screen of said display means is updated, wherein said display means is responsive to occurrence of the music update instruction information from said music update instruction information generating means and sequentially takes in and displays image information temporarily stored in said temporary storage means each for partitioned image information corresponding to an associated one of a plurality of partial areas of a field, in a format according to the page feed format information generated from said page feed format information generating means.

7. An electronic musical instrument according to claim 5, wherein said display means takes in and displays said partitioned image information at a speed according to a tempo of a musical composition which said performance means is performing.

8. An electronic musical instrument comprising:

performance information generating means for generating performance information of a musical composition;

performance means for performing the musical composition in accordance with the performance information generated from said performance information generating means;

temporary storage means for temporarily storing image information representative of music of the musical composition to be performed;

image information generating means for generating image information representative of music of the musical composition to be performed to write the same into said temporary storage means;

music update instruction information generating means for generating music update instruction information to instruct update of music as the performance of the musical composition by said performance means advances; and display means having a frame memory for storing image information and a screen on which an image based on the image information stored in said frame memory is displayed, wherein when said music update instruction information generating means generates the music update instruction information, said frame memory takes in the image information temporarily stored in said temporary storage means in a form of units of partial areas divided from the screen, and music is displayed on the screen in accordance with the image information stored in said frame memory.

* * * * *